Figure 9:
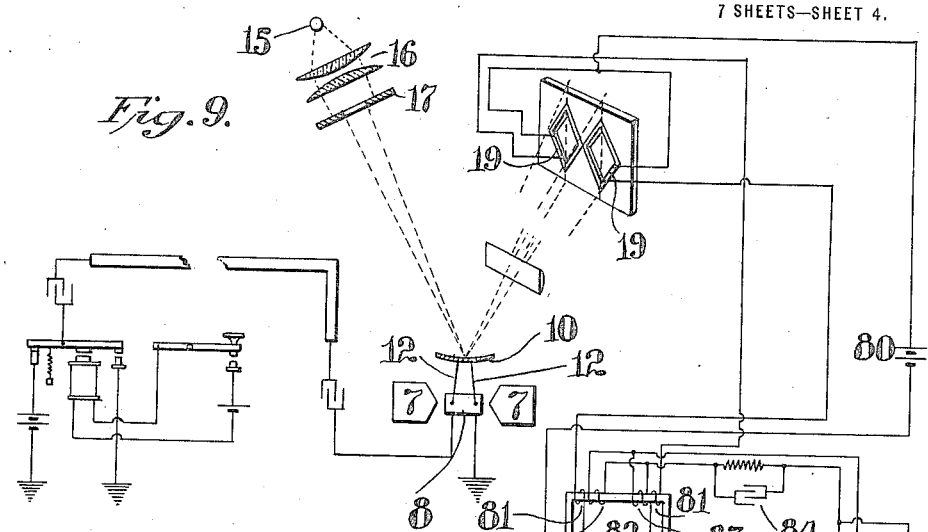

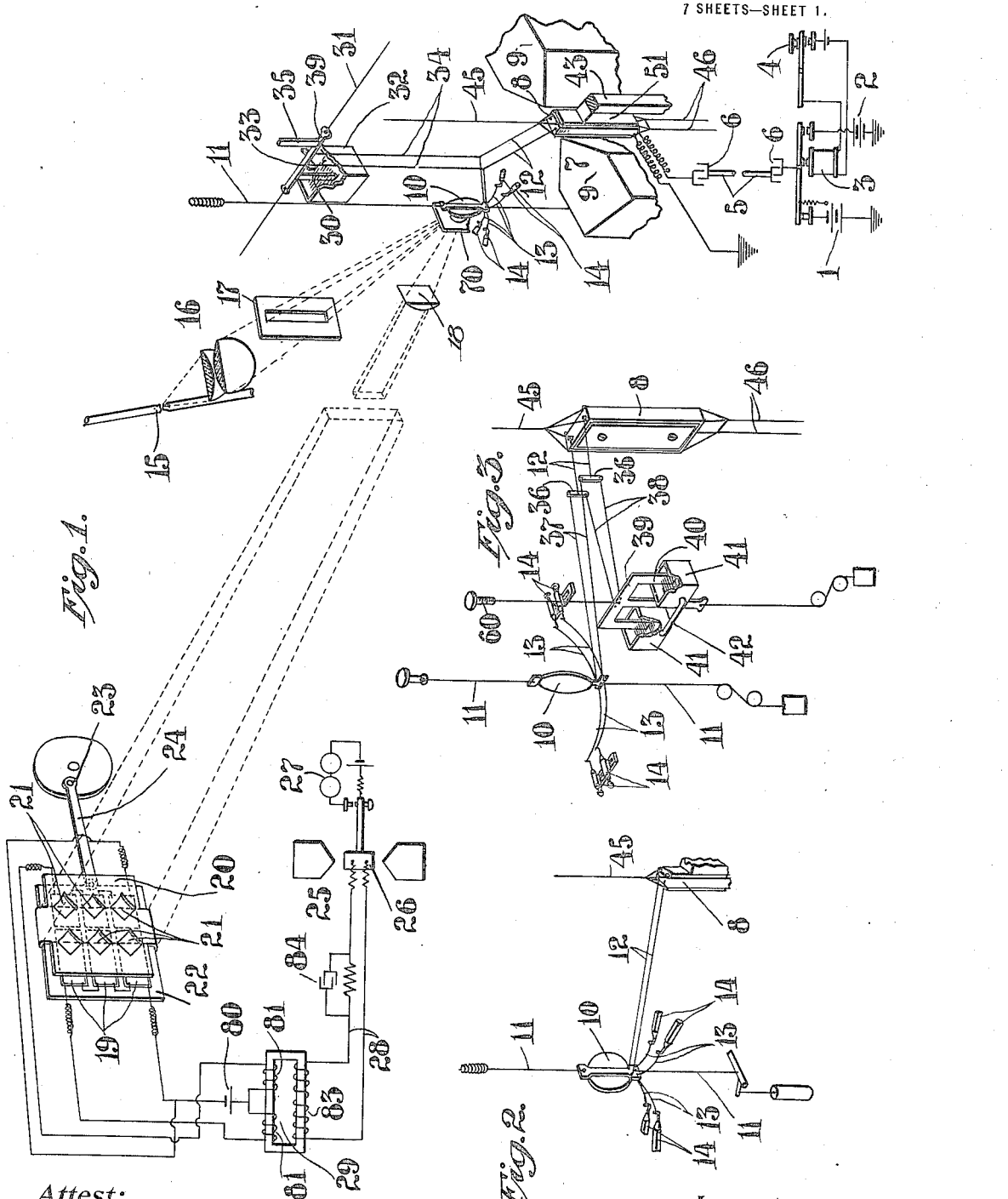

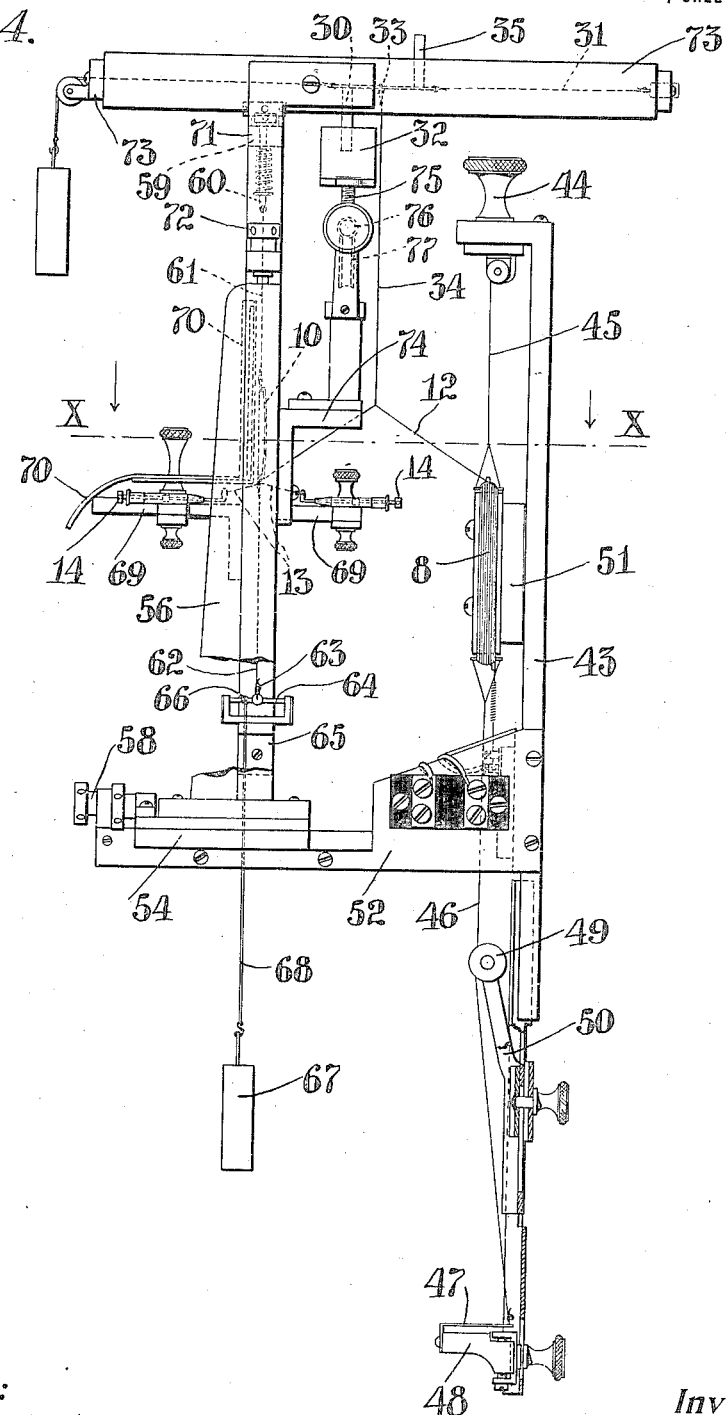

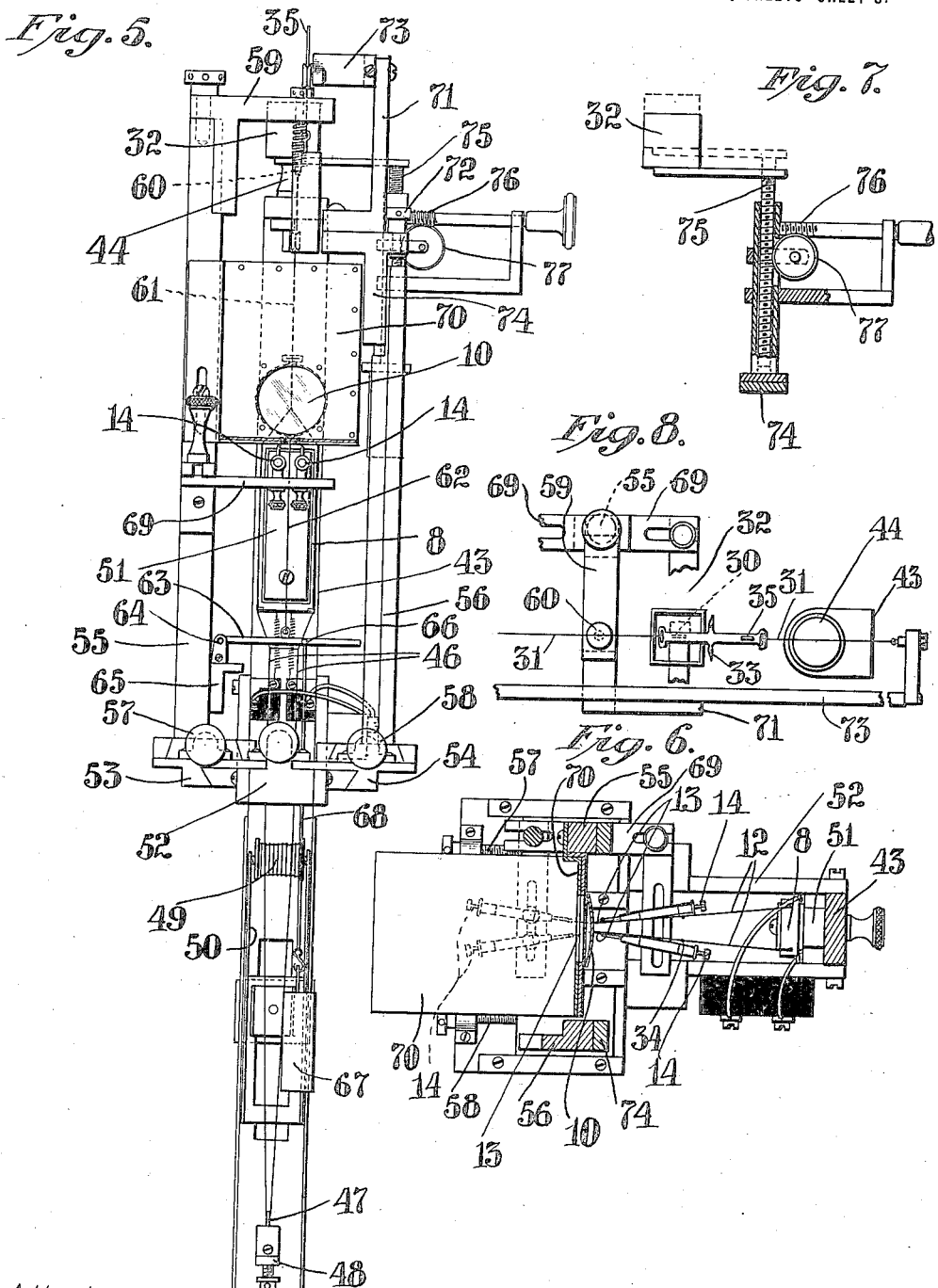

T. B. DIXON.
TELEGRAPHY.
APPLICATION FILED FEB. 5, 1908. RENEWED JAN. 24, 1916.

1,197,460.

Patented Sept. 5, 1916.
7 SHEETS—SHEET 4.

Attest:

Inventor:
Thomas B. Dixon
Atty

T. B. DIXON.
TELEGRAPHY.
APPLICATION FILED FEB. 5, 1908. RENEWED JAN. 24, 1916.
1,197,460.
Patented Sept. 5, 1916.
7 SHEETS—SHEET 5.
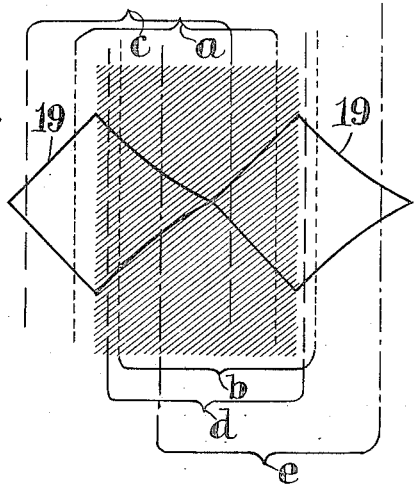
Fig. 11.
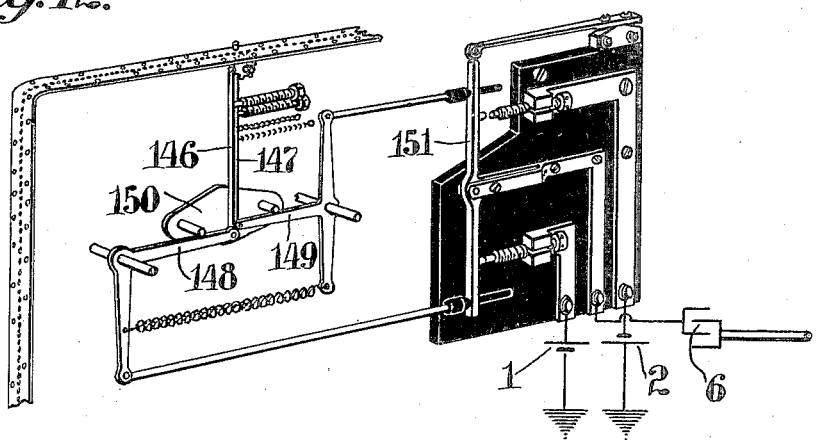
Fig. 12.
Fig. 13.
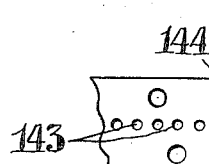
Attest:
by
Inventor:
Thomas B. Dixon
H. M. Marble
Atty T. B. DIXON.
TELEGRAPHY.
APPLICATION FILED FEB. 5, 1908. RENEWED JAN. 24, 1916.
1,197,460.
Patented Sept. 5, 1916.
7 SHEETS—SHEET 6.
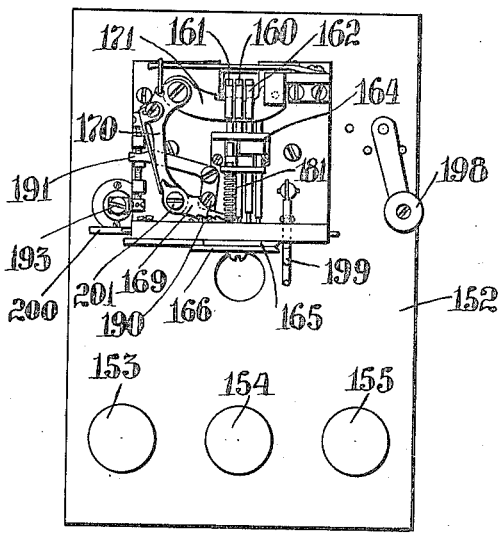
Fig. 14.
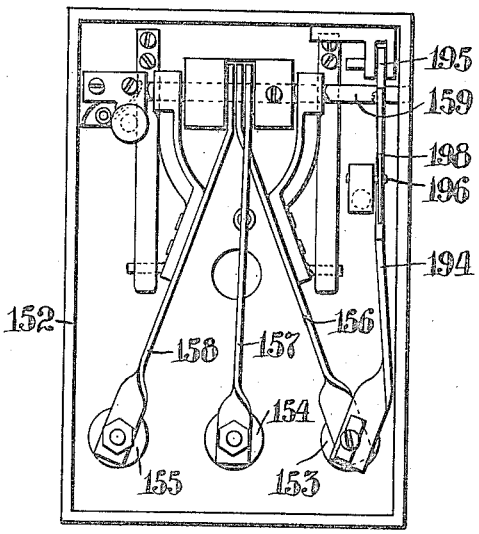
Fig. 15.
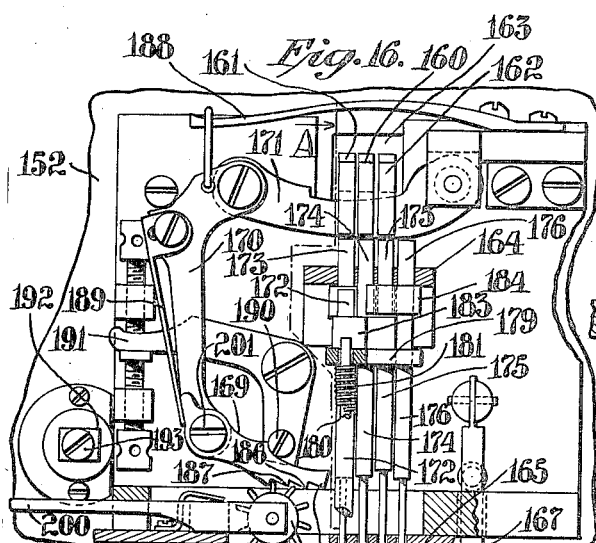
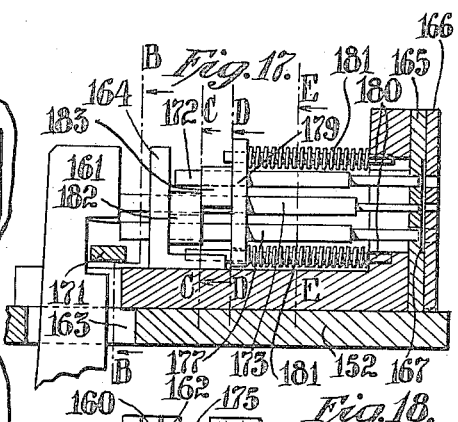
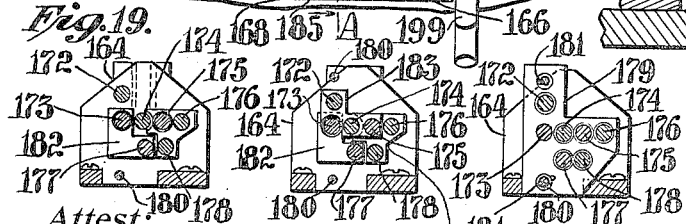
Attest:
Mitchell
Frank E. Ruppman
Inventor:
Thomas B. Dixon
by H. M. Marble
Atty

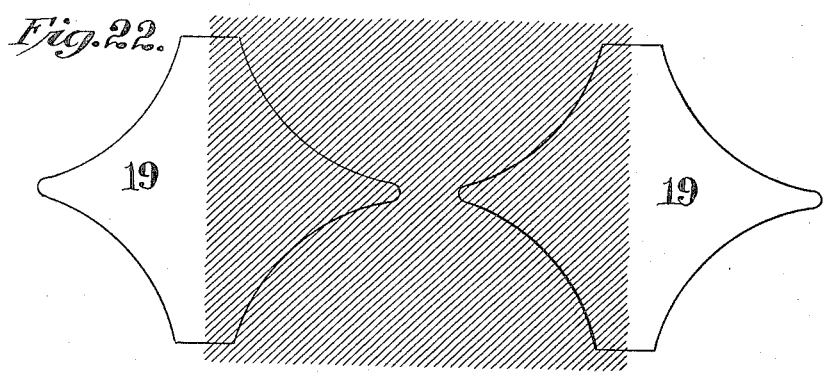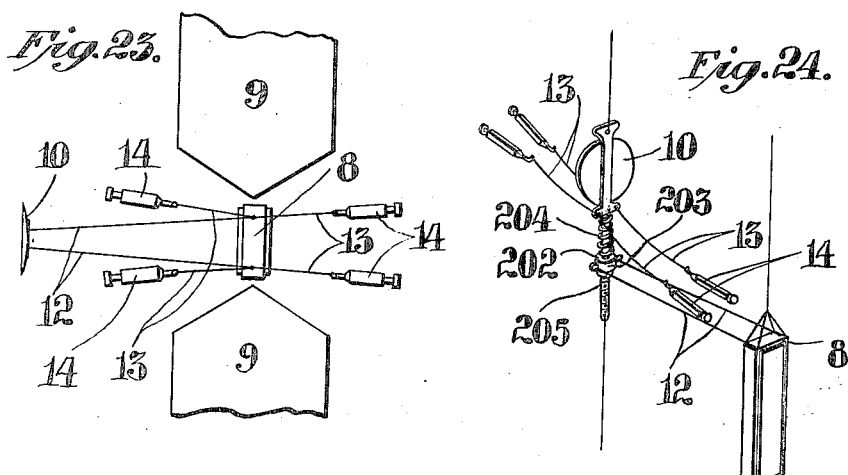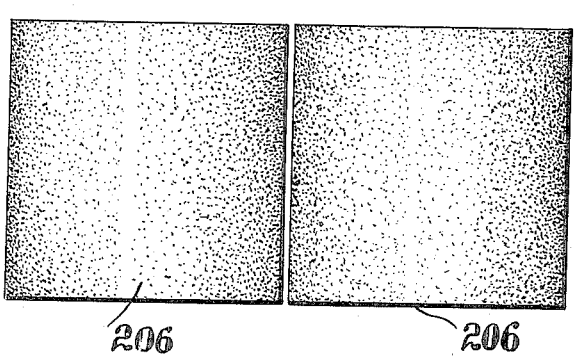

UNITED STATES PATENT OFFICE.

THOMAS B. DIXON, OF NEW YORK, N. Y.

TELEGRAPHY.

1,197,460.  Specification of Letters Patent.  Patented Sept. 5, 1916.

Application filed February 5, 1908, Serial No. 414,419. Renewed January 24, 1916. Serial No. 74,063.

*To all whom it may concern:*

Be it known that I, THOMAS B. DIXON, a citizen of the United States, residing at New York, in the county of New York and State of New York, have invented certain new and useful Improvements in Telegraphy; and I do hereby declare the following to be a full, clear, and exact description of the same, such as will enable others skilled in the art to which it appertains to make and use the same.

My invention relates to telegraph systems and apparatus, and particularly to systems and apparatus adapted for use in connection with lines of very great retardation, such as submarine cable lines, and comprises improved receiving apparatus, capable, even when operated by line current variations which are extremely feeble and of uncertain sign with reference to the true zero, of producing Morse characters or other code characters on an ordinary sounder, or on the tape of an ordinary register, or of repeating such characters into another cable. My said receiving apparatus is substantially unaffected by "variation of the zero," such as commonly occurs from time to time on long submarine cable lines, and is more sensitive than the siphon recorders, circuit-controlling receiving relays, and like receiving devices heretofore employed, and is also capable of operating at a higher rate of speed and with greater definition between pulses.

Heretofore the receiving devices commonly used on long cable lines have been galvanometers arranged to deflect a beam of light to and fro, or siphon recorders, which in construction are analogous to galvanometers but which are provided with means for tracing a record line on a moving strip, or sensitive relays analogous in construction to galvanometers but the movable member of which is arranged to operate electrical contacts. Of these, the first is of course the most sensitive, but produces no permanent record, and its signals are exceedingly difficult to interpret at high speed. Siphon recorders produce a permanent record, but are less rapid in action than galvanometers, and are less sensitive; notwithstanding which disadvantages, they have been used commonly in the past, in lieu of galvanometers, because of the difficulty of interpreting galvanometer signals, above referred to. It is characteristic of both galvanometers and siphon recorders, however, that signals are not clearly defined; that during the transmission of a series of dots, for example, the intervals between the dots are not clearly defined, (the line having, as usual, great retardation), so that in practice the observer determines the number of such dots more by the duration of the deflection of the beam of light or length of the corresponding wave traced on the record slip, than by anything else. The definition of the signals is further impaired by what is termed "tailing-off" of the pulses, due to the fact that, transmission being through condensers, the strength of the current pulses in the line decreases as the condensers approach full charge or discharge independent of whether the transmitting battery or generator is still connected to the transmitting condenser or not; and still other conditions, for example, the "variation of the zero" or variation of the midpoint between positive and negative deflections, with reference to the normal zero, further increase the difficulty of reading cable messages. Relays operating electrical contacts and so able to control other relays, sounders, registers, or repeating devices, have not proved practicable for use at high speeds on long cable lines, for various reasons, such as trouble from variation of the zero, lack of sensitiveness, etc.; lack of sensitiveness being due to inertia, and, in some cases, friction of the contact arm, to sticking together of contact points, and other causes.

In the system herein described, the receiving apparatus comprises what may be termed a radio-electric relay, comprising an actuating member (such as a galvanometer), controlled by current pulses in the line circuit and arranged to vary the action of a beam of radiant energy; a radio-electro-sensitive element exposed to such beam of radiant energy (a thermopile, selenium cell, or actinium cell, for example) such thermopile or selenium cell or other variable resistance device included in an electric circuit; and a controlled member, such as a relay, controlled by such circuit.

In the following description I will describe the use of a selenium cell, or group of such cells, as the radio-electro-sensitive element of such a radio-electric relay.

The electrical resistance of the substances selenium, actinium, and possibly other substances, varies greatly according as such substance be in light or in darkness; and in the usual construction of one class of instruments, termed selenium cells, made to take advantage of this property, a layer of selenium overlays two conductor wires wound in coils side by side with their respective coils alternated; these wires being connected to opposite sides of a circuit including a source of electric current, when the cell is in use. In darkness the selenium has very high resistance, and therefore practically no current passes through it from one wire to the other; but when brightly illuminated the resistance of the selenium layer is lower and so more or less current passes through it from one wire to the other. The action of actinium is understood to be just the opposite of selenium. In this specification I use the term "selenium cell" as generic to all like variable resistance devices, whether the variable material be selenium or something else, and whether the variation be due to the action of light rays, heat rays, or other forms of radiant energy.

If such a variable resistance device or selenium cell be placed in an electric circuit provided with means for causing an electric current to flow through it, for every variation of the resistance of such cell there will be a corresponding variation of current strength in such circuit, by which a delicate relay or other suitable device for reproducing or re-transmitting signals may be operated. In practice, I do not control such relay or other signal-reproducing or signal-retransmitting instrument directly by the circuit of the selenium cell, but instead control it inductively, through a suitable induction coil or coils. For this there are several reasons, the chief of which is the "variable zero" of cable lines, heretofore referred to; another reason is that selenium cells are somewhat sluggish, as compared with the operation of a sensitive galvanometer, and after any given change of illumination occupy an appreciable interval of time in reaching the resistance corresponding to the new degree of illumination; the rate of change of resistance, being nevertheless, to a considerable extent, dependent upon the rate and extent of change of the illumination.

Transmission of signals by means of a selenium cell would be very slow if dependent upon production of definite resistance of the cell. It is well known that in induction coils, the strength and direction of the induced current are proportional to the rate of change of the inducing current and upon whether the current rises or falls. Applying this principle to radio-electric relays, the circuit in which the selenium cell is included is caused to pass through the primary of an induction coil, and the relay or other instrument to be operated is connected to the secondary of such induction coil; and it will be seen that then the strength of the current by which such relay is operated is proportional to the rate of change of the resistance of such cell, whether the specific resistance of the cell be relatively high or low at any instant, and therefore a sufficient movement of the beam of light near either extreme of its movement will operate the receiving relay, even though the center of the beam of light does not cross the center of the cell in such movement. Thereby both the variable zero and the effect of sluggishness of the selenium cell are eliminated, so far as operativeness of the system is concerned; though for the sake of speed of operation it is desirable to neutralize still further the effect of sluggishness of the selenium cell, as by means of a shunted condenser as hereinafter described. Operating the controlled relay through an induction coil has the effect, however, of requiring the transmission of messages by a method different from that ordinarily used on cable lines. The method of transmission heretofore commonly used on cable lines, involves the use of pulses of one direction for "dots," and pulses of the opposite direction for "dashes"; the two kinds of pulses being, as nearly as possible, of equal length. In my system, however, transmission by current reversal is employed, the polarity of the transmitting generator being reversed, with respect to the line, at the beginning and again at the end of each signal, dot or dash; the two characters of signals being distinguished from each other by keeping the generator reversed for a slightly longer interval for a dash than for a dot; the stronger or more prolonged pulse thereby produced at the receiving end being quite distinguishable by the receiving galvanometer, so that, by the means hereinafter described, it is quite possible to distinguish positively between dots and dashes having so low a ratio of space occupied as three to five, for example. The transmission by this method has the further advantage that since there is always a reversal of current after each signal, dot or dash, there is twice the potential available to discharge the line, as compared with the former system of transmission referred to, when two or more dots or two or more dashes succeed each other. Transmission by this current reversal method is, therefore, inherently faster than by the former method referred to.

Comparing my radio-electric relay with a siphon recorder, the former may be considered as having an arm (the light beam) many feet in length, while the siphon arm of the recorder has a length of only an inch or two at the most, said light beam being without mass or inertia, and moving without any resistance such as that due to viscosity of the ink of the siphon recorder. Because of the extremely long arm (light beam) of my instrument and the fact that in its movements it produces no resistance or reaction to the movement, the actual deflection of the galvanometer coil required to produce a distinctly defined signal need be only a small fraction of the movement required of the coil of a siphon recorder to produce any distinguishable signal whatever; for which reason alone my instrument is inherently susceptible of much greater delicacy and rapidity of operation than the siphon recorder. As hereinafter shown, I still further increase the delicacy of the instrument and decrease the angle through which the coil must move to produce a clearly defined signal, by so connecting the galvanometer reflector to the galvanometer coil that movements of the coil are magnified with respect to the reflector, the latter being caused, therefore, to swing through much greater angles than the coil. And I further provide means for limiting the oscillations of the coil and reflector, by which the sticking of the movable member to its stops, hitherto substantially unavoidable, is avoided; and thereby overtravel of the mirror or reflector is avoided.

My receiving apparatus herein described, in specific embodiments comprising a galvanometer as the actuating element and a selenium cell or cells as the radio-sensitive element, therefore comprises a reflecting galvanometer controlled or adapted for control by a line circuit, a source of light, a selenium cell or cells in an electric circuit or circuits provided with means for supplying current, an induction coil or coils in the primaries of which such selenium cell circuit or circuits is or are included, and a secondary circuit passing through the secondary coils of such induction coil or coils and a relay or equivalent circuit controller, signal reproducer, or signal repeater controlled by such secondary circuit.

One portion of my invention resides in the improved mounting of the reflector of such galvanometer. Instead of being mounted on the coil (or armature) itself of the galvanometer, it has an independent pivotal mounting (filamentary suspension) and is so connected to said coil or armature as to have its movement multiplied with respect to that of the coil.

Another portion of my invention resides in improved means whereby the motions of this reflector are positively limited without the sticking and consequent sluggishness characteristic of ordinary stops.

Still another portion of my invention resides in the employment of selenium cells or other radio-sensitive elements in pairs, and preferably in a plurality of pairs, so connected and arranged as to coöperate to produce a cumulative effect in the primary of the induction coil; and still another portion of my invention resides in means for spreading out the beam of light so as to avoid unnecessary waste of light.

Other features of my invention will be pointed out hereafter.

In the accompanying drawings I illustrate a few only of the very many possible embodiments of my invention in telegraph receiving, recording and reproducing apparatus and systems.

Figure 10:
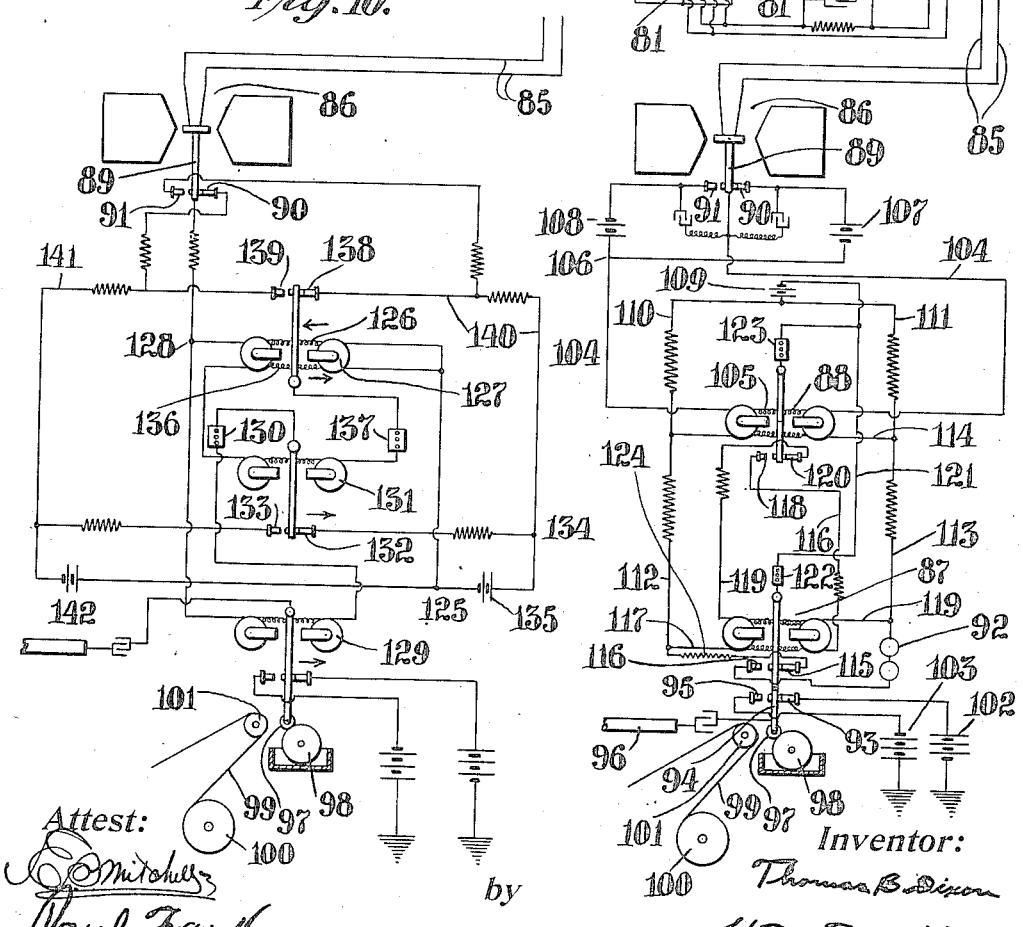

In said drawings: Figure 1 is a perspective view, more or less diagrammatic in its nature and with many of the structural details omitted, of one form of my said apparatus, showing particularly one filamentary connection of the galvanometer coil and mirror and retarding device, also showing a preferred arrangement of the selenium cells with reference to the beam of light. Fig. 2 is a similar perspective view of an alternative structure in which the connection between coil and mirror is slightly different. Fig. 3 is a further similar view, showing a still different connection of coil, mirror and retarding device. Fig. 4 shows a side elevation of the coil, mirror, and checking device, and the mountings therefor, as actually constructed in one embodiment of my invention, the connections between coil, mirror and checking device being those shown in Fig. 1; Fig. 5 is a front view of the same parts, and Fig. 6 shows a horizontal section of the same parts, taken on the line X—X of Fig. 4. Fig. 7 shows a detail vertical section of the mechanism for adjusting the retarding device, and Fig. 8 is a detail top view of the upper portion of the instrument. Fig. 9 is a diagrammatic view, with mechanical details omitted, of a complete system, embodying a radio-electric relay such as above described at the receiving end of the line having for its actuated element (termed hereafter for convenience a receiving relay) a compound relay of special type particularly adapted for such use, and adapted also to act as a repeating instrument and as a recorder; and Fig. 10 is a similar diagram of an alternative form of such compound receiving relay. Fig. 11 is a diagrammatic view illustrating various positions of the light beam on two selenium cells. Fig. 12 is a diagrammatic perspective elevation of the principal parts of a known type of automatic transmitter adapted for use in my system, and controlled in its operation by a perforated message tape; and Fig. 13 is a front view of a portion of such a tape, illustrating an improved system of perforations therein to represent dots, dashes and spaces of the telegraphic code. Figs. 14–21 incl. illustrate perforating mechanism which may be used for perforating a tape according to such system, Fig. 14 showing a top view of such perforator, Fig. 15 showing a view of the under side thereof, Fig. 16 showing a top view, on a larger scale, of the punches and feeding devices, Fig. 17 showing a section of the perforating mechanism on the line A—A of Fig. 16, Fig. 18 showing a detail transverse section on the line B—B of Fig. 17, Fig. 19 showing a detail transverse section on the line C—C of Fig. 17, Fig. 20 showing a detail transverse section on the line D—D of Fig. 17, and Fig. 21 showing a detail transverse section on the line E—E of Fig. 17. Fig. 22 shows a face view of two selenium cells of specifically different outline from those previously shown. Fig. 23 is a diagrammatic plan view illustrating an alternative arrangement for the stop fibers. Fig. 24 is a diagrammatic perspective elevation of the galvanometer coil and mirror showing an alternative yielding connection between the galvanometer coil and mirror. Fig. 25 illustrates two screens adapted to be placed in front of the selenium cells, and which near their centers are substantially transparent and which from such points grow progressively more opaque toward their ends; such screens constituting alternative means for causing movement of the beam of light to vary the intensity of illumination of the cells.

In Fig. 1 I have indicated diagrammatically one transmitting apparatus which may be used, comprising two transmitting batteries, 1, 2, connected to opposite poles of a pole-changing transmitter 3 controlled by a telegraph key 4 in the ordinary manner, opposite poles of said batteries being connected to the transmitter and to ground, so that a positive or a negative pulse will be sent through the line according as one battery or the other is connected to the line. 5 designates a cable or line circuit. The condensers 6, usually employed in cable circuits, are located at the ends of this cable. 7 designates a delicate galvanometer, having a coil armature 8, delicately mounted by means of a torsional suspension to swing in a permanent magnetic field induced by pole pieces, 9, 9 of a powerful magnet. The coil 8 is included in the circuit of the cable. 10 designates the mirror or reflector of the galvanometer, not mounted on the galvanometer coil, however, but having a separate filamentary suspension 11, constructed to have as little torsional action as possible, said coil and mirror being connected by two delicate filamentary traces 12, 12, which are fibers similar to those employed in the suspensions. The points of connection of these two traces, 12, 12 to the mirror are much closer to the axis than the points of connection of such traces to the axis of the coil 8; and therefore for any particular oscillatory movement of the coil the mirror will have a corresponding but much greater movement; the effect being the same, in principle, as if the coil transmitted motion to the mirror through multiplying gearing. Heretofore much difficulty has been experienced in positively checking this motion of delicately mounted members such as galvanometer coils and the like. Stop screws or abutments are not satisfactory for the purpose, as there is apt to be some sticking of the coil or other movable member to a stop after it has once contacted therewith, due to adhesion, moisture-film phenomena, or possibly other causes, this sticking greatly reducing the delicacy of the instrument. In my instrument I positively limit or check the motion of the mirror, at predetermined limits, by means of four delicate stop-fibers, 13, 13, connected to said mirror and to corresponding adjustment screws 14, 14. By arranging these stop-fibers in pairs, two on one side of the mirror and two on the other side, the two fibers of each pair connected to the mirror on opposite sides of the pivotal axis thereof, side-strain on the suspension is avoided, diagonally-opposite fibers becoming taut at the same instant; and therefore the action of these stop-fibers does not tend to cause vibration of the mirror out of its axis of suspension. I make these stop-fibers 13 very short and extremely light, and thereby substantially avoid over-travel and oscillation of the mirror due to elasticity or resiliency of the stop-fibers. Since the mirror does not touch anything, in its oscillation, there is no sticking of the mirror against stops to impair the delicacy of the instrument.

I represent at 15, Fig. 1, a source of illumination (shown in this instance as a pair of arc-light carbons); 16 designates a condensing lens and 17 a screen by which the light is limited to a beam of the desired size and cross-section (rectangular, in this case). The converging beam of rectangular section thus produced impinges on the mirror 10, and is reflected thereby through a lens, such as a plano-convex cylindrical lens 18, upon the selenium cells. As the beam reaches the cells it is of approximately rectangular section.

While one selenium cell is by itself effective to produce fluctuations in an electric circuit in which it is included, much stronger effects may be obtained by employing the cells in pairs, so arranged with respect to the beam of light that as said beam decreases the illumination of one cell, it increases the illumination of the companion cell; and still better results may be obtained by using a plurality of such pairs of cells. In Fig. 1, I have shown six cells, 19, 19, arranged in rows of two each. In front of these cells is a screen, 20, having in it six openings 21, each opening in front of one of the cells; these openings being nearly square, in the instance shown; one diagonal of each such opening being substantially parallel to the direction of movement of the light beam; for a reason explained hereinafter. The width of the beam of light is preferably such, as indicated by dotted lines, that when the beam is in mid-position it reaches to the centers of both openings 21, so that any movement of the beam of light increasing the illumination of the one row of cells or openings will decrease the illumination of the other row.

It is desirable in some cases, when the light used is particularly intense, and the maximum current which the cell will carry is employed, to expose fresh surfaces of the selenium cells continually, avoiding prolonged exposure of any portion of the cell surface. For this purpose I have shown the cells mounted on a frame 22 to slide horizontally back of the screen 20, reciprocating motion being imparted to said frame by suitable means, as for instance a crank 23 and pitman 24. The cells are much longer than the openings 21 in said screen, and therefore as the frame moves fresh surface is continually exposed and the previously-exposed surface is retired behind the screen and given an opportunity to recuperate. Except for the benefit obtained by using cells larger than the openings 21 but partly masked by screen 20, and moving the cells back of said screen, as described, to expose fresh surfaces of the cells, the effect is the same as if the cells were coterminous with openings 21; and in the following description I will in the main, refer to the cells as though they were coextensive with and coterminous with said openings 21.

It is best to cause selenium cells to control a relay or like instruments, not by placing such relay directly in the circuit of the cell or cells, but by placing the relay in a circuit inductively connected to the cell circuit; this for the reasons that the resistance of a cell, for any given intensity and degree of illumination, is not always constant, selenium cells being somewhat slow in reaching final resistance after any change in illumination, and because the cable line itself rarely reaches absolute zero between current changes, and is apt to have a bias toward one polarity or the other, this bias shifting from time to time for various reasons. These difficulties in the way of direct control of a relay or other instrument by the selenium cells are not experienced when the relay is controlled inductively; for then the strength of the induced current by which such relay is operated is proportional to the rate of change of resistance of the selenium cell. In Fig. 1 I have shown a relay 25 controlled inductively by the selenium cells 19, and, therefore, by the galvanometer 7, said relay being itself quite delicate, and similar in construction to galvanometer 7, except that the coil, 26, has a suspension having little or no torsional action and said coil instead of operating a mirror through traces, operates a contact arm adapted to make contact with a fixed contact stop and therefore adapted to control a local circuit in which is a sounder or other signal-receiving instrument, 27. The circuit, 28, of this relay, passes through the secondary of an induction coil 29. Said induction coil has two primaries, one in circuit with one vertical row of cells, the other in circuit with the other vertical row of cells, a battery supplying current to both circuits, said circuits being so connected to the primaries of the induction coil that increase of resistance of one vertical row of cells, and decrease of resistance of the other vertical row of cells, produce like inductive effects. The cells of each vertical row are, in the particular arrangement shown, connected in series, as shown.

It it will be understood that, for clearness of illustration, the various parts shown in Fig. 1 are not drawn to the same scale. In practice, the galvanometer coil 8 and the mirror 10 are quite small, while the openings 21 in screen 20 and the cells themselves are relatively much larger. Also the distance between the galvanometer coil and the mirror is at the most, in practice, only a few inches, and the lens 18 is usually placed within a foot or two of the mirror, while the distance from said lens to the selenium cells is often, and with advantage, many feet; fifteen to twenty feet or more. Likewise, the fibers of the filamentary suspension and the stop fibers are much smaller than indicated in Fig. 1 or in any of the other figures; said fibers being so small as to be almost invisible except when a strong light is shining directly upon them. Likewise I have not attempted to show the actual adjustment of the stop fibers, the slack in which should be very slight,—merely sufficient to permit the almost imperceptible movement of the mirror which suffices to move the light beam so that it just illuminates fully the left-hand row of apertures 21, and just misses the right-hand apertures 21 or vice versa.

In some cases it is desirable to permit the coil 8 to continue to move after the mirror has been stopped by the stop-fibers. One method of doing this is illustrated in Fig. 1; a blade, 30, having a filamentary support, 31, being arranged to oscillate back and forth in a reservoir 32 containing some liquid, such as glycerin. A cross-arm, 33, connected to said blade, is connected by fibers 34 to the two traces 12, the tension of these fibers 34 keeping the traces 12 somewhat bowed as shown. Any pull on one of the traces 12, therefore, tends to straighten out that trace, and so to pull on the corresponding fiber 34, so moving the blade 30 in the liquid; and after the mirror itself has been stopped the coil 8 may continue to move, the blade 30 moving to permit such movement. Regulation is obtained by raising or lowering the reservoir. To avoid the effect of unbalanced gravity on the blade 30, a counter-balance 35 is provided for said blade. In many cases, however, such a yielding device may be dispensed with, coil 8 and reflector 10 being connected by taut and practically straight traces 12, as shown in Fig. 2.

Fig. 3 illustrates an alternative method of connecting the galvanometer coil both to the reflector and to a yielding device. Two equalizers, 36, are each connected to the coil 8 by a trace 12, and are each connected by a trace 37 to the reflector and by a trace 38 to the yielding device, the result being that motion of the coil 8 is transmitted both to said reflector and to the yielding device. Said device, in the form shown in this figure, consists of a light T-shaped object 39, having a filamentary suspension, and having two blades 40, each partly immersed in liquid in one of two reservoirs 41 connected by a duct 42 to insure equal level of liquid in the two reservoirs.

Figs. 4, 5 and 6 show the actual mechanical construction of one of the mountings for the coil, reflector, and retarding device in one embodiment of the invention, the field magnets being removed. 43 designates an upright frame member, adapted to be held in a suitable support, not shown, between the poles of a powerful magnet. At its upper end is a screw 44 from which the coil 8 is suspended by means of a single fiber 45. Two fibers 46 extend from the lower end of this coil to a spring 47, carried by a bracket 48 adjustably mounted on frame 43. These fibers 46 pass over the surface of a grooved roller 49, carried by a bracket 50 adjustably mounted on the frame 43. This roller serves as a convenient means for holding the fibers 46 separated the desired distance, and so facilitates adjustment of the stiffness of the torsional suspension. Adjustment of such stiffness may also be effected by moving the bracket 48 of spring 47 up or down slightly, so varying the pull exerted by said spring. On frame member 43 is a soft iron core 51 projecting into the coil 8 which when the instrument is in use is polarized by induction from the magnet between the poles of which the coil 8 is placed, and serves to concentrate the lines of force. A shelf 52 projects out from member 43, and carries slides 53 and 54 for uprights 55 and 56 respectively. These slides are adjustable in and out by means of screws 57 and 58 respectively. Upright 55 carries at its upper end a bracket 59, provided with an adjustment screw 60 from which hangs the upper fiber 61 of the mirror suspension; the mirror, 10, hanging from this fiber. From this mirror hangs the lower fiber 62, of the suspension, said fiber connected at its lower end to the arm 63 of a delicate rock shaft 64, mounted in bearings in a bracket 65 carried by upright 55; said rock shaft having an arm 66 having a weight 67 suspended from it by a cord 68. Brackets 69 carried by upright 55 carry the adjusting screws 14 of the mirror stop-fiber 13. A screen 70 carried by the upright 55 and having in it an aperture in line with and slightly smaller than the mirror 10, serves to confine the beam of light to the mirror, and to protect the suspension fibers and stop-fibers from the heat of the beam. The upright 56 carries a slide 71, adjustable up and down upon it by means of a screw 72 and carrying a bracket 73 carrying the fiber 31 by which the blade 30 is supported. Another bracket 74 secured to upright 56 has mounted in its end a screw 75 carrying the reservoir 32 for the blade 30; and said bracket also carries a worm-shaft 76 for rotating a worm wheel 77 engaging screw 75 as a rack-gear; so that by rotating shaft 76 screw 75 and reservoir 32 may be raised or lowered.

In Fig. 9 I illustrate digrammatically the radio-electric relay above described, and show as the controlled element of it a relay of the type I prefer for operating a sounder or a recorder or repeating contact points; the complete instrument here indicated diagrammatically being a combined receiver, recorder and repeater. I have shown only two selenium cells but it will be understood that there may be as many pairs of these cells as desired; likewise, I have omitted the means for vibrating the cells shown in Fig. 1, but it will be understood that same may be used if desired. I have also shown in section an arrangement of the condensing lens combination 16, which I have found convenient, comprising two plano-convex lenses like ordinary condensing lenses, placed with their convex sides toward each other. 80 designates the battery for supplying current to the selenium cells; said cells being connected in multiple to said battery as shown, each cell thence connected to its separate coil 81 in the primary of the induction coil 82, the said coil 82 having in this case, separate secondaries 83 each corresponding to one of the primaries 81, said secondaries connected in multiple. In circuit with these secondaries are shunted condensers 84. Circuit conductors 85 lead to a relay 86, of the same general type as relay 25 of Fig. 1. This relay forms the actuating or primary relay of a compound relay of the type set forth in my Patent No. 560,313, dated May 19, 1896; the particular construction of compound relay illustrated being an improvement on and modification of the compound relay of said patent, which improvement is described and claimed in my Patent No. 939,401, dated November 9, 1909. Said compound relay comprises besides the primary relay 86, another relay 87 and a third relay 88 and suitable circuits hereinafter described. For present purposes it is enough to say that this compound relay is in effect an ordinary relay of extreme sensitiveness, the armature lever of relay 87 in all cases being reversed in position following shifting of position of the contact arm 89 of relay 86. The currents passing through the contact points of relay 86 may be quite feeble and therefore may have relatively little action tending to cause adhesion of contact arm 89 to either of its stops 90 and 91. For this reason, and because relay 86 is in construction similar to an ordinary galvanometer, said relay 86 is itself very sensitive and is capable of being operated by relatively small current pulses; all of which is important in instruments such as this in which, in view of the small current pulses in the line or cable circuit, the current available to operate a relay controlled by the circuit of the selenium cells is at the best weak when working at high speed. The compound relay may have in one of its local circuits, hereinafter described, a sounder 92; and the sub-relay 87 may have repeater contacts 93, 94 and 95 for repeating the signals into a second cable or other circuit 96. I have further indicated said relay 87 as comprising part of a recorder or register, its armature being provided with an inking roll 97, adapted in one position of the armature to contact with an inking drum 98 and in the opposite position to contact with a paper strip 99 passing from a reel 100 over a suitable guide and feed roll 101. Transmitting batteries or other suitable generators 102 and 103 are connected to the relay contact points 93 and 95 respectively. In this system, therefore, I may provide for the audible reproduction of the signals transmitted, for the recording of such signals, and for the retransmission or repeating of such signals. The local circuits of this compound relay, comprising sub-relays 86, 87 and 88, are as follows: From the contact arm 89 of relay 86, a conductor 104 leads to a coil 105 of sub-relay 88, and thence to 106, where the circuit divides, one branch passing to contact stop 90 and including a generator 107, the other branch passing to contact stop 91 and including a generator 108. Said generators being of equal strength but being oppositely connected to the contact stops, it is clear that movement of the contact arm 89 has the effect of reversing the direction of the current in relay coil 105. The direction of current in this coil 105 determines the action of relays 88 and 87. Battery 109 is connected to what is in effect a Wheatstone bridge, the four arms of which, 110, 111, 112 and 113, comprise suitable resistances, as usual, and the cross-wire, 114, of which, passes through another coil of relay 88. Arm 112 is connected to stop 115 of relay 87, and arm 113 to stop 116 of that relay. A branch 117 from 112 passes through a coil of relay 87 to stop 118 of relay 88 and thence back to battery through the armature of relay 88, provided contact with such armature be closed.

Another branch, 119, from arm 113 of the bridge, passes through another coil of relay 87 to contact stop 120 of relay 88 and thence back to battery provided contact with such armature is closed, as it is with the parts as shown. The armature of relay 87 is also connected to battery 109 by a conductor 121, this constituting the return of the Wheatstone bridge. In circuit with the armatures of relays 87 and 88 are regulating rheostats 122 and 123 respectively. The operation is as follows: Supposing, for the present, that the arms of the Wheatstone bridge are balanced, so that there is no flow of current through the crosswire 114, the armature of relay 88 is held to the right or "spacing" side by the current through coil 105, and is still held there by residual magnetism, if the armature 89 of relay 86 breaks contact with stop 90 or remains for a time in an intermediate position, as may happen owing to torsion of the suspension of said armature. But when armature 89 touches contact stop 91 current flows through coil 105 in the direction to cause the armature of relay 88 to move to the left or "marking" side, circuit through coil 119 of relay 87 being thereby broken and circuit completed through coil 117 of that relay, so moving the armature of relay 87 to the left or "marking" side; whereupon the circuit of arm 112 of the bridge is now completed back to battery 109 through the armature of relay 88, and the circuit of arm 113 of the bridge is completed back to battery 109 through the armature of relay 87. The parts remain in this position until the armature 89 of relay 86 again makes contact with stop 90, whereupon the armatures of relays 87 and 88 move back to the positions indicated and the circuits are restored to their first condition.

It will be noted that when the parts are at rest, whether the armatures be in the "marking" or in the "spacing" position, rheostat 122 is in one arm of the Wheatstone bridge, viz., that controlling relay 87, and rheostat 123 is in the other arm of the bridge, viz., that controlling relay 88. This makes it possible to so disturb the balance between the two sides of the bridge, by proper relative adjustments of rheostats 122 and 123, that normally there is a current through the crosswire 114 and corresponding coil of relay 88 almost sufficient to overcome the effect of residual magnetism on the armature of that relay, so that only a weak current in coil 105 is required to start the armature of relay 88, the current through the crosswire carrying such armature over against its opposite stop, once it is started. This makes it possible to adjust the compound relay to extreme sensitiveness, and avoids the necessity of passing through the contacts of relay 86 currents of such strength as to cause noticeable adhesion of the contact points. At the same time, a relatively large current flows through the coils of relay 87, so that said relay has ample power to operate repeating contacts, recorder mechanism, etc.

Obviously a sounder, pole-changing transmitter, or other suitable instrument may be placed in either side of the Wheatstone bridge (preferably where its magnet is not energized when the armatures of relays 87 and 88 are in the normal or "spacing" positions) and balancing resistance placed in the other side of the bridge. In Fig. 9, 92 designates such a sounder or other instrument, in arm 113 of the bridge, and 124 a balancing resistance, in branch 119.

In Fig. 10 I show an alternative form of receiving compound relay. Neglecting for a moment the effect of the closing of one or the other of the contacts of sub-relay 86 of this instrument shown in Fig. 10, there is as will be seen, a circuit from point 125 through coil 126 of relay 127 to 128 and thence through the coil of relay 129 and rheostat 130 to the armature of relay 131 and through contact stop 132 of that relay to 134 and thence through battery 135 back to point 125. There is also another circuit from point 125 through coil 136 of relay 127 and the coil of relay 131 and rheostat 137 and the armature of relay 127 to the contact stop 138 of that relay and back through conductor 140 and the battery 135 to point 125. Coils 126 and 136 of relay 127 are opposed, and therefore nearly or entirely neutralize each other, when both coils are energized. Contact stop 91 of relay 86 is connected to conductor 140 through high resistance, and contact 90 of said relay 86 is connected to corresponding conductor 141 through high resistance. Battery 142, a companion battery to 135 but oppositely placed, is connected to the circuits of coils 126 and 136 of relay 127, but with the armature of relay 127 in the position shown is ineffective except as to the high resistance branch connected to stop 90.

With the armature 89 of relay 86 at rest in its right hand position, as shown, battery 142 is connected to stop 90 through one of the high resistance branches. When said armature 89 moves into contact with its left hand stop 91, there is a "leakage" current from battery 135, through coil 126, tending to move the armature of relay 127 to the left or "marking" side; and as soon as contact with stop 138 is broken the circuit through coil 136 is broken and the full strength of current through coil 126 is available to continue the movement of the armature to the left. As soon as contact with stop 139 is closed, since battery 142 is now connected to coil 136 in place of battery 125, the armature of relay 131 is reversed; and as soon as this armature begins to move the circuit from battery 135 through coil 126 is broken and as soon as said armature of relay 131 reaches its left hand stop a circuit from battery 142 through coil 126 and the coil of relay 129, is established, relay 129 being reversed. The parts are then in positions exactly the opposite of what is shown in Fig. 10, coils 126 and 136 nearly or quite neutralizing each other. Deflection of the armature of relay 86 to the right again will, by similar series of operations, cause the armatures of relays 127, 131 and 129 to reverse their positions again.

As will be noted, rheostat 130 is in the circuit of coil 126 and rheostat 137 is in the circuit of coil 136 and by adjusting these rheostats the balance of coils 126 and 136 may be so adjusted that a very slight bleeding away of current from coil 136 through a contact of relay 86, will cause the reversal of relays 127, 131 and 129.

As previously stated, and as shown in Figs. 1, 9 and 11, particularly the latter, the selenium cells (or, what is the same thing, the apertures through which the beam of light reaches the cells) are of such shape that as the beam of light moves from side to side its margins move over a gradually increasing or decreasing width of the cell surface. This is to overcome or compensate for variation in lag of the receiving relay with respect to the current variations by which the galvanometer is operated; which lag has a tendency to shorten unduly a dash, or to lengthen unduly a dot or dash following a long space. How this variation in lag may occur, unless guarded against, may be understood from the following explanation, made with particular reference to Fig. 11, in which twin cells arranged as described are shown, the normal position of the light beam and assumed approximate limits of oscillation thereof for dots, dashes and spaces being indicated.

With the line at rest, although one of the transmitting batteries is then to the line, the light beam will be central and stationary, and will cover the area between the centers of the two selenium cells, as indicated in the figure by a cross-hatched space. If now a series of dots be transmitted, said dots succeeding each other with too great rapidity to permit complete charge and discharge of the line (dots will ordinarily be transmitted at such rate) the light beam may be supposed to move between limits $a$ and $b$ in Fig. 11, moving toward $a$ (we will suppose) at the beginning of the initial or "marking" current variation of the dot, and moving from $a$ to $b$ at the beginning of the final or "spacing" current variation of the dot, and moving again to $a$ at the beginning of the next dot, and so on. If now, closely following a series of dots, a dash be transmitted, then owing to the longer time interval available for charge of the line and movement of the galvanometer coil during the marking period, the beam of light will move beyond $a$ to some point $c$, and upon the transmission of the spacing current variation of that dash, the beam of light will move from $c$ to some point $d$. Since it is not the currents in the circuit of the coil of the galvanometer which operate the receiving relay, but rather the induced currents due to such currents in the galvonometer coil and the consequent movements of the beam of light over the selenium cells and the consequent current variations in the circuit of those cells; since strength of the induced currents which operate the receiving relay is proportional to the rate at which such inducing currents change strength; and since the receiving relay will not be operated by an induced current until the latter rises to the minimum strength required to operate that relay,—it follows that, if equal changes of area of surface of the selenium cells illuminated resulted from equal movements of the beam of light, throughout its range, the induced current would reach such required minimum strength proportionately earlier during the spacing period following a dash than during that following a dot, for during a dash the receiving condenser receives a higher charge than during a dot, and so when the spacing battery is placed to the line there is a greater difference of potential between it and said condenser after a dash than after a dot, and so the galvanometer coil will tend to move more rapidly at the beginning of the spacing period following a dash than following a dot for this reason, and also, because the torsional suspension of the galvanometer coil is under greater strain at the limit of a dash deflection than at the limit of a dot deflection; also there is more momentum of the galvanometer coil and mirror to be overcome at the end of a dot than at the end of a dash; and if as has been shown the galvanometer coil and beam of light move back at higher speed and with more rapid acceleration following a dash deflection than following a dot deflection, the induced current will rise to the minimum required to operate the receiving relay proportionately earlier during the spacing period following a dash than during the period following a dot, unless means be taken to prevent this. This effect would be fatal, for high speed working if it could not be counteracted, for its result is to make a dash shorter than it should be, so that it is hardly distinguishable from the dots. There is a similar effect when a dot or dash follows a long space— say a space having an interval as long as or longer than a dash—only in such case the result is to make the dot or dash begin proportionately earlier than it should and so to lengthen it, which may have the effect of making a dot following a space indistinguishable from a dash. This variable lag of the receiving relay with reference to the currents which operate the galvanometer may be compensated for and overcome, however, by arranging the selenium cells as indicated in the drawings, so that the surface illumined does not vary at a rate directly proportional to the rate of movement of the beam of light, but at a different rate.

Referring to Fig. 11 again, and considering first the right-hand selenium cell, it will be seen that when the beam of light is at $c$ it illuminates a smaller surface of the cell than when at $b$, and that although the beam of light may start to move from $c$ to $d$ more rapidly than it would if moving from $a$ to $b$, the area of surface illumined does not vary as rapidly, in proportion to the rate of movement of the beam, at the beginning of the movement from $c$ to $d$ as at the beginning of movement from $a$ to $b$; and the effect on the left-hand selenium cell is similar, the illumination of this cell decreasing as that of the other cell increases. It follows, therefore, that the slower rate of change of surface illumined, during the first part of the movement from $c$ to $d$, as compared with movement from $a$ to $b$, and the resulting slower change of resistance of the cells, tends to counteract the effect of the more rapid acceleration of the beam after a dash than after a dot, so that by properly proportioning the cells, or the apertures through which the light reaches the cells, variable lag of the receiving relay may be eliminated altogether and the dots and dashes may be caused to have their intended ratio. Similarly, by properly shaping the opposite sides of the selenium cells, or the apertures through which the light reaches said cells, variable lag following spaces may be eliminated. Spaces are often much longer than dashes; if dashes and dots have the ratio of 5 to 3, spaces may have the ration of 7 or 9 to 3, and therefore the disturbing effect of variable lag may be greater, after spaces, than after dashes. To compensate for this, it is merely necessary to make the taper of the selenium cells, or the apertures through which the cells are illumined, less on the spacing side than on the marking side. This is illustrated in Fig. 11, the taper of the selenium cells being there shown as less on the right-hand or space side, than on the left-hand or marking side.

Since word spaces, etc., are longer than letter spaces, this taper on the spacing side may be by curved lines, as shown, so that the effect of the taper is greater in the case of long or word-space deflections than in the case of shorter letter-space deflections. And similarly, the taper on the marking side may be by curved lines, as shown in Fig. 22; it being possible to produce any desired rate of change of surface illuminated, in different portions of the cells, by giving proper curvature to the sides of those cells.

For the transmission of dots and dashes having so low a ratio as contemplated by me, and as is desirable for rapid transmission, it is desirable to employ an automatic transmitter—for example, a Wheatstone transmitter operated by a perforated tape. The system of perforating Wheatstone tape ordinarily used does not result in dots and dashes of so low a ratio as 3 to 5, but results in dots and dashes having the ratio of 1 to 3; a ratio which, for cable transmission, I have found to give an unnecessarily slow speed of transmission, and to be objectionable besides because of the high charge the cable acquires during dashes and long spaces. Dots and dashes of ratio of 3 to 5 may be obtained by perforating a Wheatstone tape according to the system indicated in Fig. 13, showing three dots, followed by a letter space, then by three dashes, and then followed by a word space and a dot after it. Three rows of holes are or may be punched in the tape, as in the ordinary Wheatstone system, the center row of holes, 143, being as usual to insure accurate feeding of the tape. For a dot, a hole is punched in the upper row, 144, above one of the holes 143, and another hole is punched in the lower row, 145, beneath the next hole 143. For a dash, a hole is punched in the upper row, 144, above one of the holes 143, and another hole is punched in the lower row, 145, beneath the second hole 143 beyond. For a space, a number of center row holes corresponding to the length of the desired space are punched. The Wheatstone transmitter itself requires no change, said transmitter comprising as usual two fingers, 146 and 147, mounted respectively on spring-actuated levers 148 and 149, and arranged to be oscillated by a rocker 150 oscillating in synchronism with the feeding of the tape past the ends of the fingers 146 and 147; said levers 148 and 149 actuating pole-changing contact mechanism 151 of well-known type. The Wheatstone transmitter is too well known to require further description, and is illustrated merely to show, as will now be apparent, that the space between the two perforations of a dot, in Fig. 12, corresponds to three units of time, or oscillations of rocker 150, in the operation of the transmitter, and that the space between the two perforations of a dash, in Fig. 13, corresponds to five units of time, or oscillations of rocker 150, in the operation of the transmitter; giving the desired ratio of dots to dashes. While the construction of the Wheatstone transmitter need not be changed to permit it to operate with tape perforated as described, it may be run at a much higher speed than with tape perforated according to the former method, since a dot now occupies three units of time whereas with a tape perforated according to the method formerly used it occupied but one unit.

It will be apparent that by apportioning a greater number of units to the dots, the ratio of dots to dashes may be made still lower than 3 to 5; but where the messages are to be read by ear or are to be recorded on an ordinary register, a lower ratio is hardly desirable.

The ordinary perforators used in connection with the Wheatstone transmitters are not adapted for punching the holes according to the method above described, but may be modified so as to be capable of punching the strip in this manner. Fig. 14 shows a top view of a Wheatstone perforator of well known type which has been modified as described, and Fig. 15 shows a bottom view thereof. This perforator comprises as usual, a base plate 152 carrying the perforating mechanism, which perforating mechanism includes three push buttons 153, 154 and 155, of which the first is usually for dots, the second for spaces and the third for dashes. On the under side of the base plate are three corresponding bell crank levers 156, 157 and 158, all pivoted on a shaft 159, and having heads 160, 161 and 162 (Figs. 14, 16 and 18) projecting up through an opening 163 to positions just in rear of a series of punches mounted to slide horizontally in suitable apertures in guide plates 164 and 165. In front of guide plate 165 is a die plate 166 correspondingly perforated. Between plates 165 and 166 is a channel 167 for the passage of the strip to be perforated. A star wheel 168, the teeth of which move across channel 167, is provided for feeding the strip as in ordinary Wheatstone perforators, and this star wheel is arranged to be rotated suitable distances, each time one of the keys 153, 154 and 155 are operated, by a toe 169 pivoted to and carried by a pawl 170 itself pivoted to a pivoted lever 171 arranged just in front of the heads 160, 161 and 162, so that whenever any one of these heads moves forward it carries with it the lever 171.

The punches are arranged in three series, corresponding to the series of holes to be perforated in the paper strip. As these punches are designed merely to punch single dots, dashes or spaces, and not to punch complete Morse characters, there are only so many punches as are required for punching a dot, a dash and a space in the paper strip. In the top row there is but one punch 172; in the middle row there are four punches 173, 174, 175 and 176, and in the lower row there are two punches, 177 and 178. As shown particularly in Fig. 17 the top row punch 172 does not extend to the back guide plate 164 and so is not actuated directly by either of the three heads 160, 161 and 162, but is actuated from other punches as hereinafter described. This top row punch is supported at the rear end and guided by a cross head 179 arranged to slide upon horizontal rods 180, upon which rods are coiled springs 181.

Upon the lower row punch 177 is mounted a block 182, fast upon 177 and having an aperture through which center row punch 173 slides freely; and this block 182 is just in rear of another block 183 connecting punch 172 and the two middle row punches 174 and 175. It will be seen that when either of these middle row punches 174 and 175 is encountered by one of the actuating heads, it will carry forward with it the other of said middle row punches and the top row punch 172 as well. Cross head 179, which is of the peculiar form shown best in Fig. 21, is fast on center row punch 173, the other punches passing loosely through it.

To punch holes for a dot on the paper strip, button 153 is depressed, thereby moving forward head 160, and feed lever 171 with it. Head 160 engages and pushes forward middle row punch 174, and lower row punch 177; and block 183 on punch 174 carries forward punch 175, and top row punch 172 also pushing forward cross-head 179, and so carrying forward punch 173; being the combination of punches required for a dot. Button 155, when depressed to punch holes for a dash, causes head 162 to engage middle row punch 175, and lower row punch 178, moving both forward; block 183 moving forward punches 174 and 172, and block 184, fast on punch 178, and on punch 176, then moves the latter forward, and the blocks 184 and 183 move cross-head 179 forward, so moving forward punch 173.

To punch holes for a space, button 154 is depressed, thereby moving forward head 161. This head engages and pushes forward center row punch 173, none of the other center row punches or upper or lower row punches being actuated. The space button 154 is depressed, for a space, a number of times corresponding to the intended length of the space.

The lever 171 and pawl 170 are provided with the usual spring 188, and the pawl 170 carries the usual spring 189 for actuating the toe 169. The usual stop 190 mounted upon an adjustable bell crank lever 191, is provided for the toe 169.

The star wheel 168, which controls the feeding of the paper strip, is fed forward different distances according to which of the buttons 153, 154 and 155 is operated. Head 162, being closest to the pivotal point of feed lever 171, moves pawl 170 backward the greatest distance, so that the tooth 185 of its toe 169 engages a point of the star wheel and rotates said star wheel upon release of the button 155 and consequent return of the head 162 and lever 171 and pawl 170. Head 160 moves said toe 169 back far enough so that its tooth 186 engages a point of the star wheel; and head 161 moves said toe back far enough so that its tooth 187 engages a point of the star wheel. Thereby the different lengths of feed required for the different signals to be punched is secured.

To prevent over-travel of the toe 169 when moved backward by the depression of the button 155, preparatory to feeding the star wheel for a dash, I provide a cushion block 192 mounted on a vertically movable rod 193. A lever 194 pivoted at 195 and arranged to be depressed by the dot button 153 when the latter is depressed, is arranged to engage a pin 196 projecting from this rod 193, so as to depress said rod when the dot button is depressed. In normal position block 192 engages the head of screw 201 when pawl 170 is moved back by depression of the dash button 155, permitting said pawl to move backward the full distance necessary by preventing over-travel. When rod 193 is depressed, said piece 192 engages the toe 169 instead, permitting pawl 170 to move backward only the distance required for a dot.

For guiding the paper strip into the slot 167 an idler 198 is provided. A delicate spring-supported lever 199 guides and supports the lower edge of the strip. A lever 200 is provided as usual for retracting the star wheel when first introducing a paper strip into the apparatus.

The operation of the apparatus is as follows: The message to be transmitted is preferably perforated on a paper strip by means such as shown in Figs. 14–21 inclusive, or equivalent means, and when this has been done the strip is passed through an automatic transmitting machine, such as shown in Fig. 12, such automatic transmitter being connected to the line the same as transmitter 4 in Fig. 1; and said transmitter 4 may be considered as, in Fig. 1, the diagrammatic representation of the automatic transmitter, the use of which is to be preferred because of the regularity of the "sending" by such a transmitter. The use of a hand key in place of an automatic transmitter is not precluded, however. The transmitter, by its operation, places marking battery 2 to the line, for each dot or dash, for a greater or less interval of time, according as the signal is a dash or a dot, and then places the spacing battery 1 to the line again. When the marking battery 2 is so placed to the line the transmitting condenser 6 charges, and through it the line and the condenser 6 at the receiving end of the line also charges. When battery 1 is again placed to the line the condensers and line discharge and then charge again with the opposite potential. The resulting current variations in the circuit of the coil 8 of the receiving radio-electric relay cause said coil to move slightly and so to move the reflector 10 and deflect the light beam toward the left, at the beginning of a signal, and toward the right again at the end of a signal, thereby varying the resistance of the selenium cells and so producing current variations in the primary circuit of the induction coil, which in turn produce current variations in the secondary circuit of the induction coil, which are proportional to the rate of movement of the beam and so not dependent as to sign or required strength upon the movement of the beam taking place on any particular portion of the selenium surface. By these induced current variations the receiving relay, 25 in Fig. 1 or 86 in Figs. 9 and 10, is operated, and through it the sounder, recorder or repeater connected to the apparatus for operation by it. Since a dash produces a longer deflection of the light beam than a dot, in turn producing a longer interval between the marking and spacing pulses in the secondary circuit of the induction coil, the signals will be received as dots and dashes by the receiving sounder, recorder or repeater.

In the movements of the beam of light over the tapering edges of the selenium cells the variation in rate of change of surface illuminated with reference to the rate of movement of the beam compensates for the otherwise variable lag in the operation of the receiving relay with respect to the galvanometer, as previously explained, and so prevents "clipping" of dashes and the lengthening of dots or dashes following long spaces. The relatively small ratio of dashes to dots—5 to 3 in the instance assumed—makes it relatively easy to proportion the cells to substantially compensate for the tendency to variable lag, while the overcoming of the variable lag disturbance makes such small ratio of dashes and dots practicable while permitting clear distinction between dots, dashes and spaces, and also permits a much higher speed of transmission than would otherwise be practicable.

The shunted condenser or condensers, 84 (Figs. 1 and 9) have much to do with the clearness of definition of the signals and with the attainment of the desired rapidity of transmission. The shunted condenser, located as shown in the secondary circuit of the induction coil, counteracts the tendency to persistence of current in such secondary circuit, due to various causes. For example, supposing the beam of light to move to the left and then to come to rest, it will be clear that during the motion of the beam the resistance of the selenium cells will vary and therefore a current pulse will be induced in the secondary circuit of the induction coil. But this induced current does not cease instantly upon the beam of light coming to rest, but, in the absence of the shunted condenser, tends to die down gradually. This action, analogous to the "tailing of the pulses" observed in the working of cable lines by the apparatus ordinarily employed heretofore, is due not only to self-induction in the primary and secondary coils of the induction coil, and to electro-magnetic inertia in the cores of the induction coil, but is also due in large measure to sluggishness of the selenium cell or cells, which, as previously stated, do not instantly reach their final resistances, but tend to come more or less slowly to the final resistance after the beam of light has come to rest, and of course will cause the induction of current in the secondary circuit while so changing resistance after the beam of light has come to rest, unless means be employed to prevent. The shunted condenser constitutes such a means; as its action is, immediately after the induced current has reached a maximum and begun to decline, to discharge into the secondary circuit in a direction opposite to current previously flowing through such circuit; so that by properly proportioning the capacity of the condenser and the resistance about which it is shunted, it is practicable to substantially neutralize and overcome such persistence of current in the secondary circuit of the induction coil. It will be observed that the charge accumulated by the condenser during the movement of the beam of light is proportional to the range and speed of movement of the beam, and therefore the discharge following cessation of such movement is substantially proportional to the tailing effect to be overcome.

In Figs. 1 and 9 I have indicated diagrammatically an arrangement of the coils of induction coils 29 and 82 which has much to do with the efficiency of the apparatus. When both selenium cells are equally illuminated as shown, and consequently are of substantially the same resistance, the magnetizing effect of the current in the primary coil connected to one cell neutralizes the magnetizing effect of the current in the primary coil connected to the other cell; the winding of these primary coils, or their connection to their circuits, being such as to produce this result, as shown. It is well known that transformers or induction coils are more efficient when the variations in magnetization of their cores are close to the zero of magnetization, and are less efficient when such variations take place near magnetic saturation. By the arrangement of the coils of the induction coil shown, since the magnetization of the cores is normally zero, variations in these magnetizations will normally take place first to one side and then to the other of the zero, the induction coil therefore working within its range of maximum efficiency.

In some cases I attach the stop fibers directly to the galvanometer coil, as illustrated in Fig. 23, instead of connecting them to the mirror as illustrated in previous figures. This obviates the necessity of a yielding connection between the galvanometer coil and the mirror.

In some cases I may adjust the stop fibers which limit the swing of the reflector, so that the reflector moves through substantially the same distance for both dots and dashes, i. e., the adjustment being such that the mirror moves the maximum distance for dots and of course can move no farther for dashes. In such case dots and dashes are nevertheless clearly distinguished owing to the greater time interval occupied by the dashes. This adjustment of the stop fibers is desirable, when it can be obtained, as then the selenium cells are used with full efficiency.

Instead of the yielding connections between the galvanometer coil and mirror shown in Figs. 1 and 3, I may use a more simple frictional yielding connection such as shown in Fig. 24, wherein the traces 12 leading from the coil 8 are not directly connected to the mirror 10, but are connected to a collar 202 mounted on a round stem 203 connected to the mirror. A spring 204 or other friction device is interposed between this collar 202 and the mirror and a screw nut 205 serves to regulate the combination of this spring. It will be seen that when mirror 10 is stopped the coil 8 can continue to move, the friction connection of the collar 202 and the mirror permitting this.

Instead of causing the rate of change of surface of the selenium cells illuminated to vary, for different positions of the beam, by giving to the cells various tapering outlines, a similar effect may be obtained by interposing between the mirror and the cells screens, different portions of which are of different opacities. This is illustrated in Fig. 25, in which two screens 206 are shown adapted to be placed in front of selenium cells of similar shape. Near but slightly to one side of the center of each screen, that screen is as near transparent as it is practical to make it, and from such point the screens grow more opaque in both directions, the ratio of change of opacity of the screens being whatever ratio is desired. The effect is obviously the same or similar to that which can be obtained by giving the cells the forms shown in Figs. 1, 9, 11 and 22.

What I claim is:

1. The method of reproducing telegraphic electric signals, which consists in causing said signals to move a beam of radiant energy across the surfaces of a plurality of radio-electro-sensitive elements connected in an electric circuit to coöperate in the reproduction of telegraphic signals, the surfaces of all such elements being partly in and partly out of the beam when the latter is in neutral position, and being all in such beam throughout a considerable proportion, at least, of the range of movement of such beam, and causing the area of such surfaces exposed to such beam to vary, during movement of said beam from an extreme position toward such neutral position, at a rate different from that of the movement of said beam.

2. The method of reproducing telegraphic electric signals, which consists in causing said signals to vary the action of radiant energy on a radio-electro-sensitive element in an electric circuit, and causing the electrical quality of said element to vary, during variation of the radiant energy, at a rate different from that of such variation of radiant energy, causing such electrical quality to change at a slower rate, at the conclusion of a long signal, than at the conclusion of a short signal.

3. The method of reproducing telegraphic electric signals, which consists in causing said signals to vary the action of radiant energy on a variable-resistance radio-electro-sensitive element in an electric circuit, and causing the resistance of said element to vary, during variation of the radiant energy, at a rate different from that of such variation of radiant energy, causing such resistance to change at a slower rate, at the conclusion of a long signal, than at the conclusion of a short signal.

4. The method of compensating for variation of zero in telegraphic cable transmission of signals, which consists in causing such signals to vary the action of radiant energy on a radio-electro-sensitive element, increasing the action of the radiant energy on such element for one class of current variations and decreasing such action for another class of current variations, causing the resulting variations in electrical quality of said element to vary the flow of electric current in an electric circuit, and inducing corresponding current variations in another circuit.

5. The method of compensating for variation of zero in telegraphic cable transmission of signals, which consists in causing such signals to vary the action of radiant energy on a radio-electro-sensitive element, increasing the action, from a temporary intermediate value, for one class of current variations, and decreasing such action, from such temporary intermediate value, for another class of current variations, causing the resulting variations in electrical quality of said element to vary the flow of electric current in an electric circuit, and inducing corresponding current variations in another circuit.

6. The method of reproducing telegraphic electric signals, which consists in causing said signals to move a beam of radiant energy across the surface of a radio-electro-sensitive element in an electric circuit, which surface grows progressively narrower from an intermediate point toward both ends, one class of current variations of said signals causing the beam to move toward one end of such surface and another class of such variations causing the beam to move toward the other end of such surface, causing the resulting variations in electrical quality of said element to vary the flow of electric current in said circuit, and inducing corresponding current variations in another circuit.

7. The method of reproducing telegraphic electric signals and of compensating for variation of zero, which consists in causing said signals to move a beam of radiant energy across the surface of a variable-resistance radio-electro-sensitive element in an electric circuit, from a neutral position of partial illumination of such surface, one class of current variations moving said beam to illumine more of said surface and another class of current variations moving said beam to illumine less of said surface, causing the resulting variations of resistance of said element to vary the flow of electric current in said circuit, and inducing corresponding current variations in another circuit.

8. The method of reproducing telegraphic electric signals and of compensating for variation of zero, which consists in causing said signals to move a beam of radiant energy across the surface of a variable-resistance radio-electro-sensitive element in an electric circuit, from a neutral position of partial illumination of such surface, which surface grows progressively narrower from an intermediate point toward both ends, one class of current variations causing the beam to move to illumine more of said surface and another class of current variations causing said beam to move to illumine less of said surface, causing the resulting variations of resistance of said element to vary the flow of current in said circuit, and inducing corresponding current variations in another circuit.

9. In a telegraphic receiving apparatus, the combination with a device having electrical resistance which is variable with varying action of radiant energy, an electrical circuit therefor, a source of electrical energy therein, a second circuit, and means inductively connecting said circuits, of a galvanometer provided with means for projecting radiant energy on said variable resistance device and for varying the action of such radiant energy, and signal reproducing means operated by current reversal, controlled by said second circuit.

10. In telegraphic receiving apparatus, the combination with a device having electrical resistance which is variable with varying action of radiant energy, an electrical circuit therefor, a source of electrical energy therein, a second circuit, and means inductively connecting said circuit, of a galvanometer provided with means for deflecting a beam of radiant energy to and from said variable-resistance device and signal reproducing means operated by current reversal, controlled by said second circuit.

11. In telegraphic apparatus, the combination with a selenium cell, a circuit including the same, a source of electrical energy in said circuit, a second circuit, and means inductively connecting said circuits, of an actuating device arranged to be operated by current fluctuations, and provided with means for varying the action of radiant energy on said cell, and signal reproducing means operated by current reversal, controlled by said second circuit.

12. In telegraphic apparatus, the combination with a selenium cell, a circuit including the same, a source of electrical energy in said circuit, a second circuit, means for reproducing telegraphic signals controlled by said second circuit, and means inductively connecting said circuits, of an actuating device arranged to be operated by current fluctuations, and provided with means for projecting radiant energy on said selenium cell, and means for varying the action of radiant energy on said cell.

13. In telegraphic apparatus, the combination with a selenium cell, a circuit including the same, a source of electrical energy in said circuit, a second circuit, and means inductively connecting said circuits, of an actuating device arranged to be operated by current fluctuations, and provided with means for deflecting a beam of radiant energy to and from said selenium cell, and signal reproducing means operated by current reversal, controlled by said second circuit.

14. In telegraphic apparatus, the combination with a selenium cell, a circuit including the same, a source of electrical energy in said circuit, a second circuit, and means inductively connecting said circuits, of an actuating device arranged to be operated by current fluctuations, and provided with means for projecting a beam of radiant energy on said selenium cell, and for varying the influence of said beam thereon, and signal reproducing means operated by current reversal, controlled by said second circuit.

15. In telegraphic apparatus, the combination with a selenium cell, a circuit including the same, a source of electrical energy in said circuit, a second circuit, and means inductively connecting said circuits, of a galvanometer provided with means for varying the action of radiant energy on said selenium cell, and signal reproducing means operated by current reversal, controlled by said second circuit.

16. In telegraphic apparatus, the combination with a selenium cell, a circuit including the same, a source of electrical energy in said circuit, a second circuit, and means inductively connecting said circuits, of a galvanometer provided with means for projecting radiant energy on said selenium cell and for varying the action of such radiant energy, and signal reproducing means operated by current reversal, controlled by said second circuit.

17. In telegraphic apparatus, the combination with a selenium cell, a circuit including the same, a source of electrical energy in said circuit, a second circuit, and means inductively connecting said circuits, of a galvanometer provided with means for deflecting a beam of radiant energy to and from said selenium cell, and signal reproducing means operated by current reversal, controlled by said second circuit.

18. In a system of signal transmission, the combination with current reversing transmitting means and a line circuit including a condenser, said transmitting means comprising means which charges the line in opposite senses at the beginning and end of each signal, of receiving apparatus comprising a radio-electric relay operated by current pulses in said line circuit, and signal reproducing means controlled thereby.

19. In a radio-electric relay, the combination of two radio-electro-sensitive elements, circuits including the same, an actuating element arranged to direct a beam of radiant energy upon both said radio-electro-sensitive elements, said beam when in mid-position covering a considerable portion of both, said actuating element arranged to deflect said beam from side to side, and a controlled element controlled by the circuits of both said radio-electro-sensitive elements, said circuits arranged to coöperate in the operation of said controlled element.

20. In a radio-electric relay, the combination of two radio-electro-sensitive elements, circuits including the same, an actuating element arranged to direct a beam of radiant energy upon both said radio-electro-sensitive elements, said beam when in mid-position covering a considerable portion of both, said actuating element arranged to deflect said beam from side to side, a controlled element, and means inductively connecting the same to said circuits arranged to cause current variations therein to coöperate in the operation of said controlled element.

21. In a radio-electric relay, the combination of two radio-electro-sensitive elements, circuits including the same, an actuating element arranged to direct a beam of radiant energy upon both said radio-electro-sensitive elements, said beam when in mid-position covering a considerable portion of both, said actuating element arranged to deflect said beam from side to side, a controlled element, and an induction coil comprising primary windings included in said circuits and secondary windings connected to said controlled element, said induction coil having its windings so arranged that increase of exposure to said beam of one said radio-electro-sensitive element and decrease of such exposure of the other such element produce like effects on said controlled element.

22. In a radio-electric relay, the combination of two variable-resistance radio-electro-sensitive elements, circuits including the same, means for supplying current to said circuits, an actuating element arranged to direct a beam of radiant energy upon both said radio-electro-sensitive elements, said beam when in mid-position covering a considerable portion of both, said actuating element arranged to deflect said beam from side to side, and a controlled element controlled by the circuits of both said radio-electro-sensitive elements, said circuits arranged to coöperate in the operation of said controlled element.

23. In a radio-electric relay, the combination of two variable-resistance radio-electro-sensitive elements, circuits including the same, means for supplying current to said circuits, an actuating element arranged to direct a beam of radiant energy upon both said radio-electro-sensitive elements, said beam when in mid-position covering a considerable portion of both, said actuating element arranged to deflect said beam from side to side, a controlled element, and means inductively connecting the same to said circuits arranged to cause current variations therein to coöperate in the operation of said controlled element.

24. In a radio-electric relay, the combination of two variable-resistance radio-electro-sensitive elements, circuits including the same, means for supplying current to said circuits, an actuating element arranged to direct a beam of radiant energy upon both said radio-electro-sensitive elements, said beam when in mid-position covering a considerable portion of both, said actuating element arranged to deflect said beam from side to side, a controlled element, and an induction coil comprising primary windings included in said circuits and secondary windings connected to said controlled element, said induction coil having its windings so arranged that increase of exposure to said beam of one of said radio-electro-sensitive elements and decrease of such exposure of the other such element produce like effects on said controlled element.

25. In a radio-electric relay, the combination of two radio-electro-sensitive elements, circuits including the same, an actuating element arranged to direct a beam of radiant energy upon both said radio-electro-sensitive elements, the outer portions of said radio-electro-sensitive elements of tapering form, said actuating element arranged to deflect the beam from side to side over such tapering portions of said radio-electro-sensitive elements, and means controlled by the said circuits.

26. In a radio-electric relay, the combination of two variable-resistance radio-electro-sensitive elements, circuits including the same, means for supplying current to said circuits, an actuating element arranged to direct a beam of radiant energy upon both said radio-electro-sensitive elements, the outer portions of said radio-electro-sensitive elements of tapering form, said actuating element arranged to deflect the beam from side to side over such tapering portions of said radio-electro-sensitive elements, and means controlled by said circuits.

27. In a radio-electric relay, the combination of two radio-electro-sensitive elements, circuits including the same, an actuating element arranged to direct a beam of radiant energy upon both said radio-electro-sensitive elements, each such element tapering in both directions from a region of greatest breadth, said actuating element arranged to deflect the beam from side to side over such tapering portions of said radio-electro-sensitive elements, and means controlled by said circuits.

28. In a radio-electric relay, the combination of two variable-resistance radio-electro-sensitive elements, circuits including the same, means for supplying current to said circuits, an actuating element arranged to direct a beam of radiant energy upon both said radio-electro-sensitive elements, each such elements tapering in both directions from a region of greatest breadth, said actuating element arranged to deflect the beam from side to side over such tapering portions of said radio-electro-sensitive elements, and means controlled by said circuits.

29. In a radio-electric relay, the combination of two radio-electro-sensitive elements, circuits including the same, an actuating element arranged to direct a beam of radiant energy upon both said radio-electro-sensitive elements, each such element having oppositely-tapering marking and spacing sides, the marking sides having greater taper than the spacing sides, said actuating element arranged to deflect the beam from side to side over such tapering portions of said radio-electro-sensitive elements, and means controlled by said circuits.

30. In a radio-electric relay, the combination of two variable-resistance radio-electro-sensitive elements, circuits including the same, means for supplying current to said circuits, an actuating element arranged to direct a beam of radiant energy upon both said radio-electro-sensitive elements, each such element having oppositely-tapering marking and spacing sides, the marking sides having greater taper than the spacing sides, said actuating element arranged to deflect the beam from side to side over such tapering portions of said radio-electro-sensitive elements, and means controlled by said circuits.

31. In a radio-electric relay, the combination of a radio-electro-sensitive element, an induction coil having a primary and a secondary, the former in circuit with said element, means in circuit with said secondary arranged to be operated by currents induced therein, and means in said secondary circuit for overcoming tailing effect.

32. In a radio-electric relay, the combination of a radio-electro-sensitive element, an induction coil having a primary and a secondary, the former in circuit with said element, means in circuit with said secondary arranged to be operated by currents induced therein, and a shunted condenser in said secondary circuit for overcoming tailing effect.

33. In a radio-electric relay, the combination of two radio-electro-sensitive elements, induction means comprising primary and secondary coils, the former in circuit with said elements, means in circuit with said secondary coils arranged to be operated by currents induced therein, the connections of said primary and secondary coils being such that increase of resistance of one radio-electro-sensitive element and decrease of resistance of the other such element produce like and cumulative effects in said secondary coils, and means for overcoming tailing effect in said secondary coils.

34. In a radio-electric relay, the combination of two radio-electro-sensitive elements, induction means comprising primary and secondary coils, the former in circuit with said elements, means in circuit with said secondary coils arranged to be operated by currents induced therein, the connections of said primary and secondary coils being such that increase of resistance of one radio-electro-sensitive element and decrease of resistance of the other such element produce like and cumulative effects in said secondary coils, and a shunted condenser in circuit with said secondary coils for overcoming tailing effect therein.

35. In a radio-electric relay, the combination of a radio-electro-sensitive element, an actuating element comprising means for oscillating a beam of radiant energy across said radio-electro-sensitive element, means electrically affected by varying illumination of said radio-electro-sensitive element comprising a circuit in which electrical variations are transmitted by reason of such varying illumination, and means for discharging into such circuit, at the conclusion of an oscillation of the beam, a counter current proportional to the last preceding movement of the beam.

36. In a radio-electric relay, the combination of a variable-resistance radio-electro-sensitive element, an actuating element comprising means for oscillating a beam of radiant energy across said radio-electro-sensitive element, means electrically affected by varying illumination of said radio-electro-sensitive element comprising a circuit connected thereto, means for supplying current to said circuit, a second circuit inductively connected to said first circuit, and means for discharging into one of said circuits, at the conclusion of an oscillation of the beam, a counter current proportional to the last preceding movement of the beam.

37. In a radio-electric relay, the combination of a selenium cell, a galvanometer comprising means for oscillating a beam of light across said cell, a circuit for said cell, means for supplying current to said circuit, another circuit inductively connected to said first circuit, and means for discharging into one of said circuits, at the conclusion of an oscillation of the beam, a counter current proportional to the last preceding movement of the beam.

38. In a radio-electric relay, the combination of a source of illumination, a radio-electro-sensitive element, and a galvanometer adapted to deflect a beam of light from said source of illumination across said element, and having a rotatable actuated member and motion-arresting means therefor comprising flexible stop-fibers.

39. In a radio-electric relay, the combination of a source of illumination, a radio-electro-sensitive element, and a galvanometer adapted to deflect a beam of light from said source of illumination across said element, and having a rotatable actuated member and four flexible stop-fibers therefor connected to said member on opposite sides of the axis of rotation thereof, two of said fibers being taut when said member is in one extreme position, and the other two fibers being taut when said member is in the opposite extreme position, the fibers so under tension simultaneously being approximately diagonally opposite each other.

40. In a radio-electric relay, the combination of a source of illumination, a radio-electro-sensitive element, and a galvanometer adapted to deflect a beam of light from said source of illumination across said element, and having a rotatable actuated member, and another rotatable member separately mounted, means for limiting motion of said second member, and means connecting said members permitting motion of the actuated member after the second member has been arrested.

41. In a radio-electric relay, the combination of a source of illumination, a radio-electro-sensitive element, and a galvanometer adapted to deflect a beam of light from said source of illumination across said element, and having a rotatable armature, a separately mounted rotatable reflector, means for limiting motion of the reflector and means connecting said armature and reflector permitting motion of the armature after the reflector has been arrested.

42. In a radio-electric relay, the combination of a source of illumination, a radio-electro-sensitive element, and a galvanometer adapted to deflect a beam of light from said source of illumination across said element, and having an armature having a fiber suspension, a reflector having a separate fiber suspension, means for limiting motion of the reflector and means connecting said armature and reflector permitting motion of the armature after the reflector has been arrested.

43. In a radio-electric relay, the combination of a source of illumination, a radio-electro-sensitive element, and a galvanometer adapted to deflect a beam of light from said source of illumination across said element, and having a rotatable armature, a rotatable reflector, fibers connecting the same, a yielding device, fibers connecting it to the fibers connecting said armature and reflector and means for limiting the motion of said reflector.

44. In a radio-electric relay, the combination of a source of illumination, a radio-electro-sensitive element, and a galvanometer adapted to deflect a beam of light from said source of illumination across said element, and having a rotatable reflector, fibers connecting the same, and a yielding device comprising a reservoir adapted to contain liquid, a blade movable in said liquid and rotatably mounted, fibers connecting it to the fibers connecting said armature and reflector and means for limiting the motion of said reflector.

45. In a radio-electric relay, the combination of a source of illumination, a radio-electro-sensitive element, and a galvanometer adapted to deflect a beam of light from said source of illumination across said element, and having a rotatable reflector, fibers connecting the same, a yielding device comprising a reservoir adapted to contain liquid, a blade movable in said liquid and having a fiber suspension, fibers connecting it to the fibers connecting said armature and reflector and means for limiting the motion of said reflector.

46. In a radio-electric relay, the combination of a source of illumination, a radio-electro-sensitive element, and a galvanometer adapted to deflect a beam of light from said source of illumination across said element, and having an armature having a torsional fiber suspension, a reflector having a mounting permitting oscillation of such reflector, such mounting having substantially no torsional action, means for limiting motion of the reflector and means connecting the armature and reflector permitting motion of the armature after the reflector has been arrested.

47. In a radio-electric relay, the combination of a source of illumination, a radio-electro-sensitive element, and a galvanometer adapted to deflect a beam of light from said source of illumination across said element, and having an armature having a torsional fiber suspension, a reflector having a separate fiber suspension having substantially no torsional action, means for limiting motion of the reflector and means connecting the armature and reflector permitting motion of the armature after the reflector has been arrested.

48. A radio-electric relay, comprising in combination two radio-electro-sensitive elements, and an induction coil having separate primaries each in circuit with one of said radio-electro-sensitive elements, and a secondary, said primaries opposing each other.

49. A radio-electric relay comprising in combination two variable resistance radio-electro-sensitive elements, an induction coil having separate primaries each in circuit with one of said radio-electro-sensitive elements, and a secondary, and means for supplying current to said primaries and radio-electro-sensitive elements, said primaries opposing each other.

50. A radio-electric relay comprising in combination two selenium cells, an induction coil having separate primaries each in circuit with one of said selenium cells, and a secondary, and means for supplying current to said primaries and selenium cells, said primaries opposing each other.

In testimony whereof I affix my signature in the presence of two witnesses.

THOMAS B. DIXON.

Witnesses:
H. M. MARBLE,
FRANK E. RAFFMAN.